United States Patent
Sugg et al.

(10) Patent No.: US 10,895,280 B2
(45) Date of Patent: Jan. 19, 2021

(54) SOCKET ASSEMBLY AND METHOD OF MAKING

(71) Applicant: Federal-Mogul Motorparts LLC, Southfield, MI (US)

(72) Inventors: Brennan Sugg, Maplewood, MO (US); Glen Parker, St. Peters, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 410 days.

(21) Appl. No.: 15/912,715

(22) Filed: Mar. 6, 2018

(65) Prior Publication Data
US 2019/0277334 A1    Sep. 12, 2019

(51) Int. Cl.
*F16C 11/06*    (2006.01)

(52) U.S. Cl.
CPC ...... *F16C 11/0638* (2013.01); *F16C 11/0633* (2013.01); *F16C 11/0642* (2013.01); *F16C 11/0657* (2013.01); *F16C 11/0685* (2013.01); *F16C 11/0695* (2013.01); *F16C 2326/05* (2013.01); *Y10T 403/32737* (2015.01)

(58) Field of Classification Search
CPC ............. F16C 11/0633; F16C 11/0638; F16C 11/0642; F16C 11/0657; F16C 11/068; F16C 11/0685; F16C 11/0695; F16C 11/086; F16C 2326/05; F16C 2326/24; Y10T 403/32737; Y10T 403/32762; Y10T 403/32811
USPC ......................................... 403/135, 138, 144
See application file for complete search history.

(56) References Cited

U.S. PATENT DOCUMENTS

| | | | |
|---|---|---|---|
| 1,377,523 A | 5/1921 | Payne et al. | |
| 1,745,704 A | 2/1930 | Muncy | |
| 1,816,661 A | 7/1931 | Skillman | |
| 2,857,190 A | 10/1958 | Moskovitz | |
| 3,089,718 A | 5/1963 | Gottschald et al. | |
| 3,494,644 A | 2/1970 | Gottschald | |
| 3,537,734 A * | 11/1970 | Gottschald .......... | F16C 11/0633 403/126 |

(Continued)

FOREIGN PATENT DOCUMENTS

| | | | |
|---|---|---|---|
| AU | 5854969 A | 1/1971 | |
| CH | 351453 A * | 1/1961 | ............ F16C 11/068 |

(Continued)

OTHER PUBLICATIONS

International Search Report, dated May 15, 2019 (PCT/US2019/020887).

*Primary Examiner* — Josh Skroupa
(74) *Attorney, Agent, or Firm* — Dickinson Wright PLLC

(57) ABSTRACT

The socket assembly includes a housing with an inner bore that extends along a central axis from a generally closed first end to an open second end. The socket assembly also includes a ball stud which includes a ball portion and a shank portion. The ball portion is received in the inner bore of the housing, and the shank portion projects out of the inner bore through the open second end. A backing bearing is disposed in the inner bore. The backing bearing has a curved bearing surface that is in slidable contact with the ball portion of the ball stud. The backing bearing includes a polymeric piece and a metal sleeve which surrounds the polymeric piece to resist radial expansion of the polymeric piece.

15 Claims, 7 Drawing Sheets

(56) References Cited

U.S. PATENT DOCUMENTS

| | | | | |
|---|---|---|---|---|
| 3,847,490 A | * | 11/1974 | Uchida | F16C 11/068 403/140 |
| 4,071,933 A | * | 2/1978 | McEowen | F16C 11/0685 29/898.051 |
| 6,012,847 A | | 1/2000 | Kahle | |
| 6,422,779 B1 | * | 7/2002 | Spagnuolo | F16C 11/0638 403/138 |
| 8,235,622 B2 | | 8/2012 | Brunneke | |
| 9,291,195 B1 | * | 3/2016 | Parker | F16C 11/068 |
| 2005/0111908 A1 | * | 5/2005 | Green | B62D 7/166 403/135 |

FOREIGN PATENT DOCUMENTS

| | | | | |
|---|---|---|---|---|
| DE | 1170200 B | * | 5/1964 | F16C 11/0633 |
| DE | 19610886 A1 | * | 1/1997 | F16C 11/0633 |
| DE | 102014225312 A1 | * | 6/2016 | F16C 11/068 |
| GB | 1067426 A | | 5/1967 | |

* cited by examiner

SOCKET ASSEMBLY AND METHOD OF MAKING

BACKGROUND OF THE INVENTION

1. Field of the Invention

The present invention is related, generally, to socket assemblies and, more particularly, to compression loaded socket assemblies with a backing bearing.

2. Related Art

Socket assemblies of the type that are used in vehicle suspension and steering systems typically include a housing, a ball stud and one or more bearings which allow the ball stud to articulate and rotate relative to the housing. The bearings are typically made of either metal or a hard plastic material. Such socket assemblies may be radially, compression and/or tension loaded. In compression loaded socket assemblies, extremely tight dimensional tolerances for the bearings, housing and ball stud are typically required and, if one or more components are out of tolerance, damage to one of the bearings could occur and/or the ball stud could become locked with the housing, thereby preventing rotation and/or articulation of the ball stud. At least one solution has been developed which allows for looser tolerances of the components in a compression loaded socket assembly, but the bearings in that solution are made of metal.

SUMMARY OF THE INVENTION AND ADVANTAGES

One aspect of the present invention is for a socket assembly which includes a housing with an inner bore that extends along a central axis from a generally closed first end to an open second end. The socket assembly also includes a ball stud which includes a ball portion and a shank portion. The ball portion is received in the inner bore of the housing, and the shank portion projects out of the inner bore through the open second end. A backing bearing is disposed in the inner bore. The backing bearing has a curved bearing surface that is in slidable contact with the ball portion of the ball stud. The backing bearing includes a polymeric piece and a metal sleeve which surrounds the polymeric piece to resist radial expansion of the polymeric piece.

The metal sleeve functions to support and restrict radial expansion of the plastic piece when the ball stud is loaded against the backing bearing, thereby improving the durability of the socket assembly. Thus, the metal sleeve allows the backing bearing to be mostly made of plastic, which provides cost and mass (weight) savings as compared to all metal backing bearings without sacrificing durability. The weight savings are particularly valuable in a vehicle because such socket assemblies are unsprung mass.

According to another aspect of the present invention, the polymeric piece of the backing bearing includes a notch to make assembly easier and to ensure that there is no interference between the metal sleeve and the plastic piece.

According to yet another aspect of the present invention, the sleeve includes a flange which extends at least partially into the notch of the polymeric piece.

According to still another aspect of the present invention, the sleeve is made of a powdered metal or of stamped steel.

According to a further aspect of the present invention, only the polymeric piece of the backing bearing contacts the ball portion of the ball stud, and the metal sleeve does not contact the ball portion of the ball stud.

According to yet a further aspect of the present invention, a spring is disposed in the inner bore between the generally closed first end of the housing and the backing bearing.

According to still a further aspect of the present invention, the curved bearing surface of the backing bearing is a first curved bearing surface, and the socket assembly further includes an exit bearing with a second bearing surface that is in slidable contact with the ball portion of the ball stud.

According to another aspect of the present invention, the housing is deformed adjacent the first end to capture the backing bearing and the ball portion of the ball stud and the exit bearing in the inner bore.

According to yet another aspect of the present invention, a spring biases the second curved bearing surface of the exit bearing against the ball portion of the ball stud.

Another aspect of the present invention is for a method of making a socket assembly. The method includes the step of preparing a housing that has an inner bore which extends along a central axis from a generally closed first end to an open second end. The method continues with the step of making a polymeric piece of a backing bearing out of a polymeric material. The method continues with the step of inserting the polymeric piece into a metal sleeve such that the metal sleeve surrounds the polymeric piece. The method proceeds with the step of inserting a ball portion of a ball stud into the inner bore of the housing through the open second end of the housing and establishing slidable contact between the ball portion of the ball stud and a curved bearing surface of the plastic piece of the backing bearing.

According to another aspect of the present invention, the polymeric piece includes a notch.

According to yet another aspect of the present invention, the metal sleeve includes a flange which extends at least partially into the notch.

According to still another aspect of the present invention, the method further includes the step of inserting a spring into the inner bore of the housing.

According to a further aspect of the present invention, the method further includes the step of deforming the housing adjacent the open second end to capture the spring and the backing bearing and the ball portion of the ball stud and the exit bearing in the inner bore.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
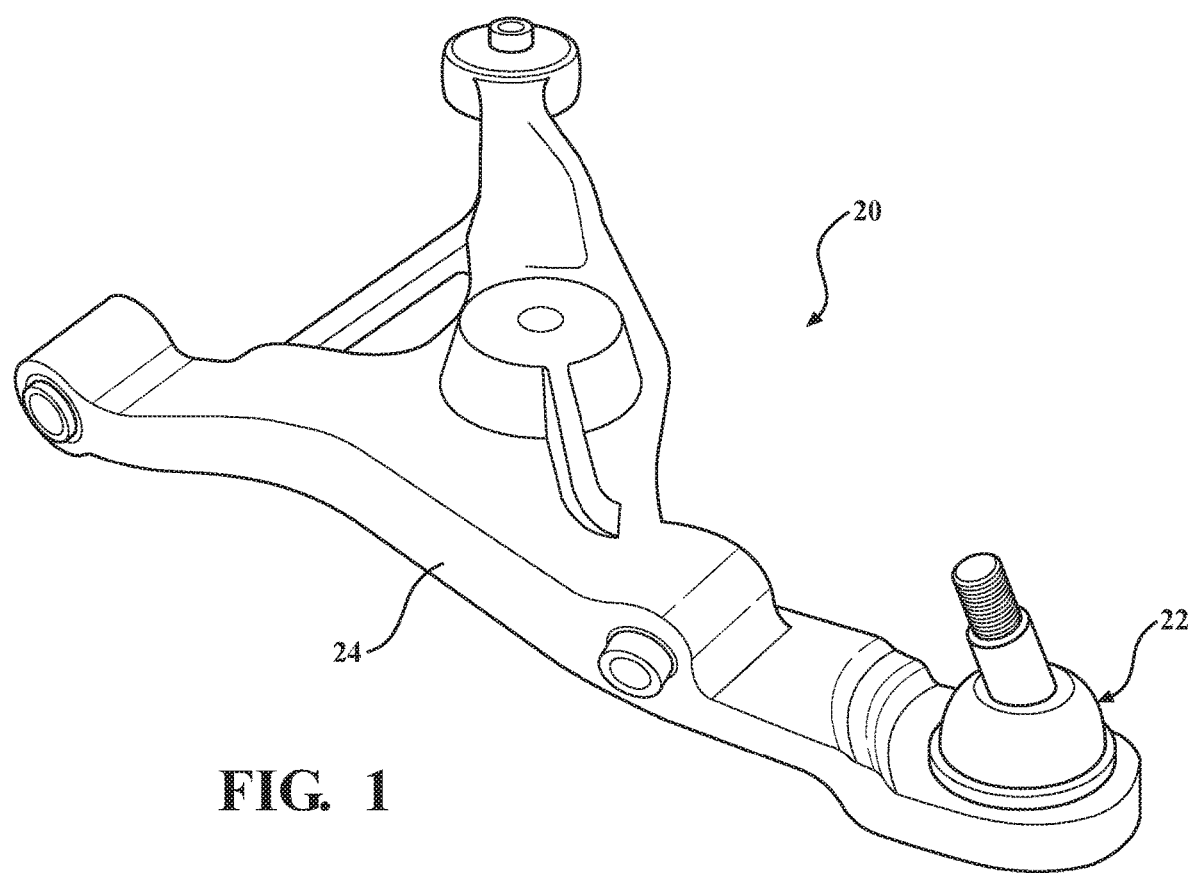
FIG. 1 is a perspective view of a control arm assembly including an exemplary embodiment of an improved socket assembly.

Referring to the Figures, wherein like numerals indicate corresponding parts throughout the several views, a control arm assembly 20, which includes an exemplary embodiment of an improved socket assembly 22, is generally shown in FIG. 1. In the exemplary embodiment, the socket assembly 22 is a compression loaded ball joint which is configured to join a control arm body 24 with a knuckle (not shown) in a vehicle suspension assembly. Although shown as a component of a control arm assembly 20 for a vehicle suspension system, it should be appreciated that the socket assembly 22 could find uses in a wide range of automotive and non-automotive applications.

Figure 2:
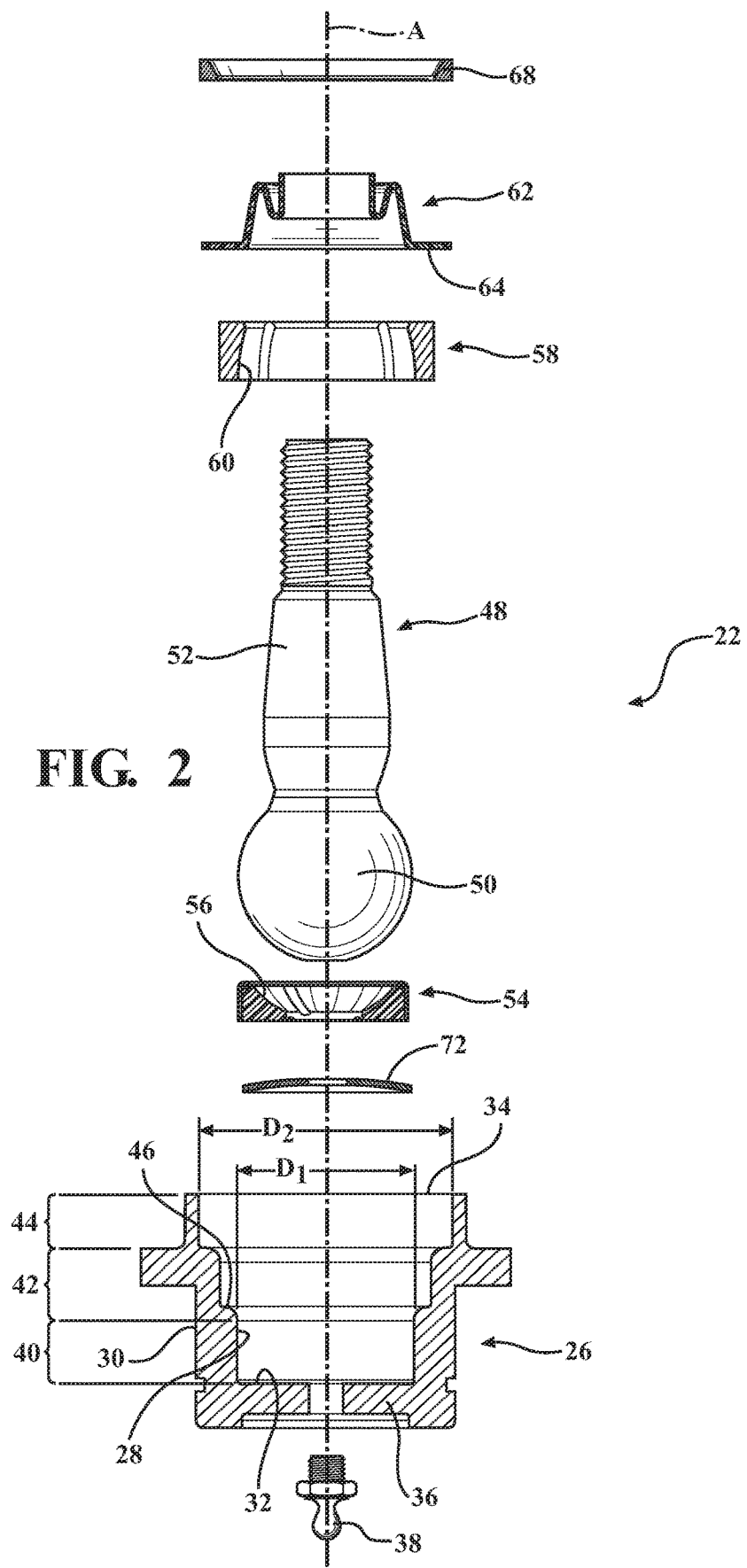
FIG. 2 is a cross-sectional and exploded view of the exemplary embodiment of the improved socket assembly.
Figure 3:
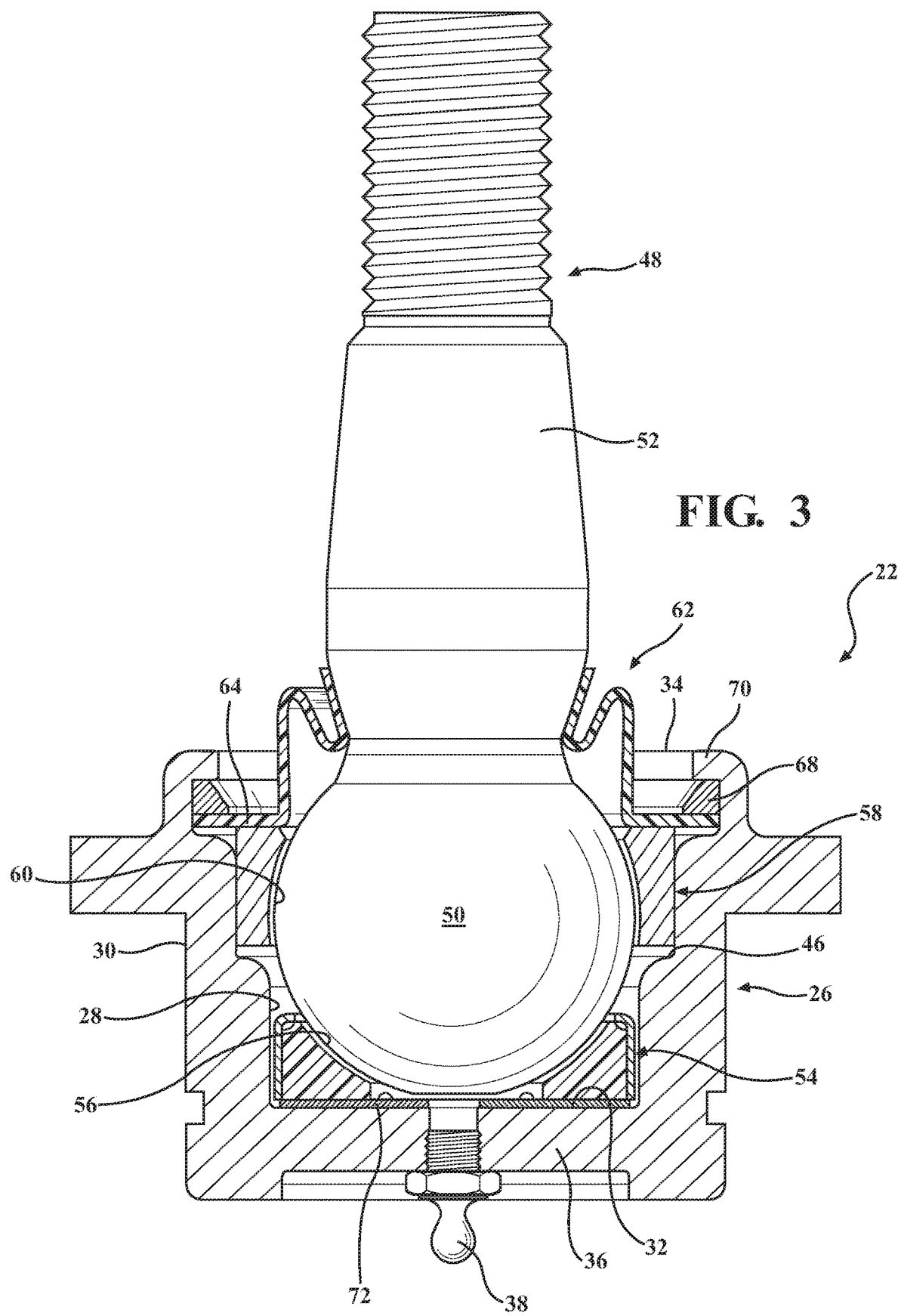
FIG. 3 is a cross-sectional view of the exemplary embodiment of the improved socket assembly.
Figure 4:
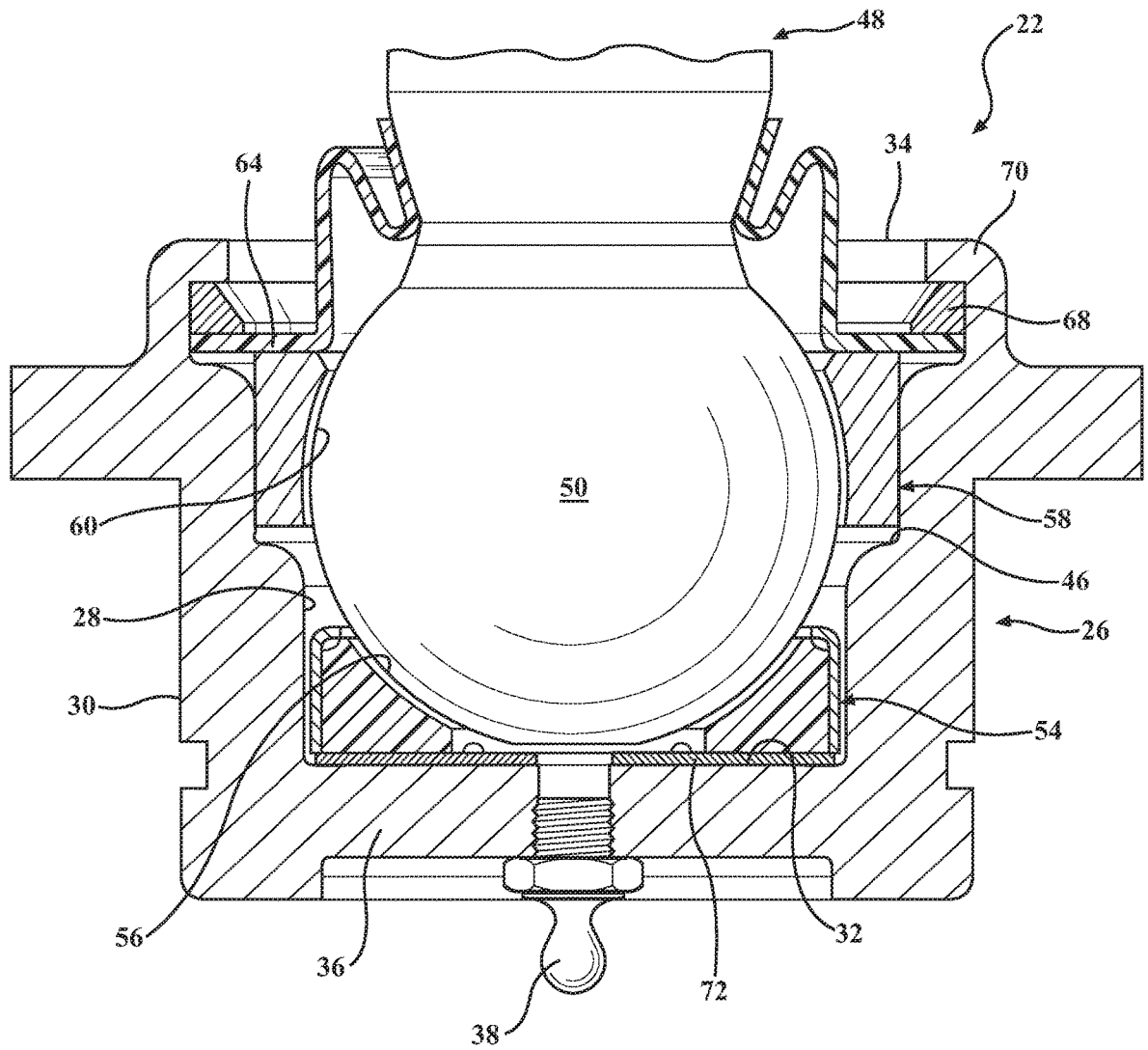
FIG. 4 is an enlarged and fragmentary view of a portion of FIG. 3.

Referring now to FIGS. 2-4, the exemplary embodiment of the socket assembly 22 includes a housing 26 which has an inner surface 28 and an outer surface 30. The inner surface 28 surrounds an inner bore that extends along a central axis A from a generally closed first end 32 to an open second end 34. At the closed first end 32, the housing 26 has a lower wall 36 with a lubricant opening which receives a grease fitting 38 (also known as a Zerk fitting) for channeling a lubricant, such as grease, into the inner bore. The housing 26 is preferably made as a monolithic piece of a metal, such as steel or an alloy steel, and may be shaped through any suitable process or combination of processes including, for example, forging, casting, machining from a billet, etc. In the exemplary embodiment, the housing 26 is a cartridge-style housing 26 in that it is configured to be inserted into an opening of another component. However, it should be appreciated that the housing 26 could alternately be made as a single piece with the other component, such as the control arm body 24 or a tie rod end (not shown).

As shown in FIG. 2, the inner bore of the housing 26 has a progressively increasing diameter from the closed first end 32 to the open second end 34. Specifically, the inner bore has a first portion 40 with a generally constant first diameter $D_1$ adjacent the closed first end 32, a second portion 42 where the inner surface 28 of the housing 26 is curved (but could be straight) and a third portion 44 with a generally constant second diameter $D_2$ adjacent the open second end 34. As shown, the second diameter $D_2$ of the third portion 44 is greater than the first diameter $D_1$ of the first portion 40. Between the second and third portions 42, 44 of the inner bore, the housing 26 presents a shoulder 46 which faces towards the open second end 34.

The socket assembly 22 further includes a ball stud 48 with a ball portion 50 and a shank portion 52. The ball portion 50 is fully disposed in the inner bore of the housing 26, and the shank portion 52 projects out of the inner bore through the open second end 34. The ball portion 50 has a generally semi-spherically curved outer face which may have one or more lubricant grooves formed thereon. The ball stud 48 is preferably made as a single, monolithic piece of metal, such as steel or an alloy steel and may be shaped through any suitable process.

A backing bearing 54 is received in the first portion 40 of the inner bore between the ball portion 50 of the ball stud 48 and the lower wall 36 of the housing 26. The backing bearing 54 has a semi-spherically curved first bearing surface 56 which faces axially towards the second open end 34 of the housing 26. The curvature of the first bearing surface 56 is similar to the curvature of the ball portion 50 such that the ball portion 50 can slide along the first bearing surface 56 thereby allowing the ball stud 48 to rotate and articulate relative to the backing bearing 54. As shown in FIG. 4, in the exemplary embodiment, the first bearing surface 56 has a lubricant opening that is aligned with the lubricant opening in the lower wall 36 of the housing 26 so that the lubricant can access the interface between the ball portion 50 and the first bearing surface 56. The first bearing surface 56 also has a plurality of lubricant grooves for distributing the lubricant across the first bearing surface 56.

The socket assembly 22 also has an exit bearing 58 which is received in the second portion 42 of the inner bore. The exit bearing 54 has a semi-spherically curved second bearing surface 60 which has a similar radius of curvature as the ball portion 50 and the first bearing surface 56. The first and second bearing surfaces 56, 60 of the backing and exit bearings 54, 58 respectively slidably contact opposite hemispheres of the ball portion 50 to allow the ball stud 48 and housing 26 to freely articulate and rotate relative to one another. As shown in FIG. 4, the exit bearing 58 is spaced axially from the backing bearing 54 within the inner bore of the housing 26.

The socket assembly 22 further includes a dust boot 62 which is made of an elastomeric material (such as rubber) and is sealed against the housing 26 and the shank portion 52 of the ball stud 48 for capturing the lubricant within and keeping contaminants out of the inner bore. The dust boot 62 extends from a first boot end, which has a radially outwardly extending flange 64, to a second boot end that is sealed against the shank portion 52 of the ball stud 48. The flange 64 is disposed in the third portion 44 of the inner bore of the housing and is in surface-to-surface contact with a top surface of the exit bearing 58.

A cover plate 68 is positioned in the third portion 44 of the inner bore at an opposite side of the flange 64 on the dust boot 62. The open second end 34 of the housing 26 is bent (such as through swaging) to create a radially inwardly extending lip 70 that engages the cover plate 68 to capture the cover plate 68, flange 64 of the dust boot 62, exit bearing 58, ball portion 50 and backing bearing 54 within the inner bore of the housing 26. Swaging the housing 26 also pre-loads the spring 66 to impart a biasing force against the exit bearing 58.

A spring 72 in the form of a Belleville washer 72 is disposed in the inner bore and is sandwiched between the backing bearing 54 and the lower wall 36. As shown in FIG. 4, the spring 72 is elastically compressed to exert an axial biasing force onto the backing bearing 74 to preload the curved first bearing surface 56 of the backing bearing 54 against the ball portion 50 of the ball stud 48, thereby maintaining the slidable contact between the backing bearing 54 and the ball portion 50 as these components wear during use of the socket assembly 22.

The backing bearing 54 has an outer diameter that is less than the first diameter $D_1$ of the first portion 40 of the inner bore such that the footprint, or outer perimeter, of the backing bearing 54, as viewed in cross-section, is smaller than the footprint of the first portion 40 of the inner bore. Thus, when the backing bearing 54 is received in the first portion 40 of the inner bore, there exists an annular gap between the backing bearing 54 and the inner surface 28 of the housing 26. The gap allows the backing bearing 54 to move, or float, in a radial direction within the inner bore.

The movability of the backing bearing 54 within the inner bore of the housing 26 allows for relaxed tolerances for the various components of the socket assembly 22 without compromising the performance of the socket assembly 22.

Figure 5:
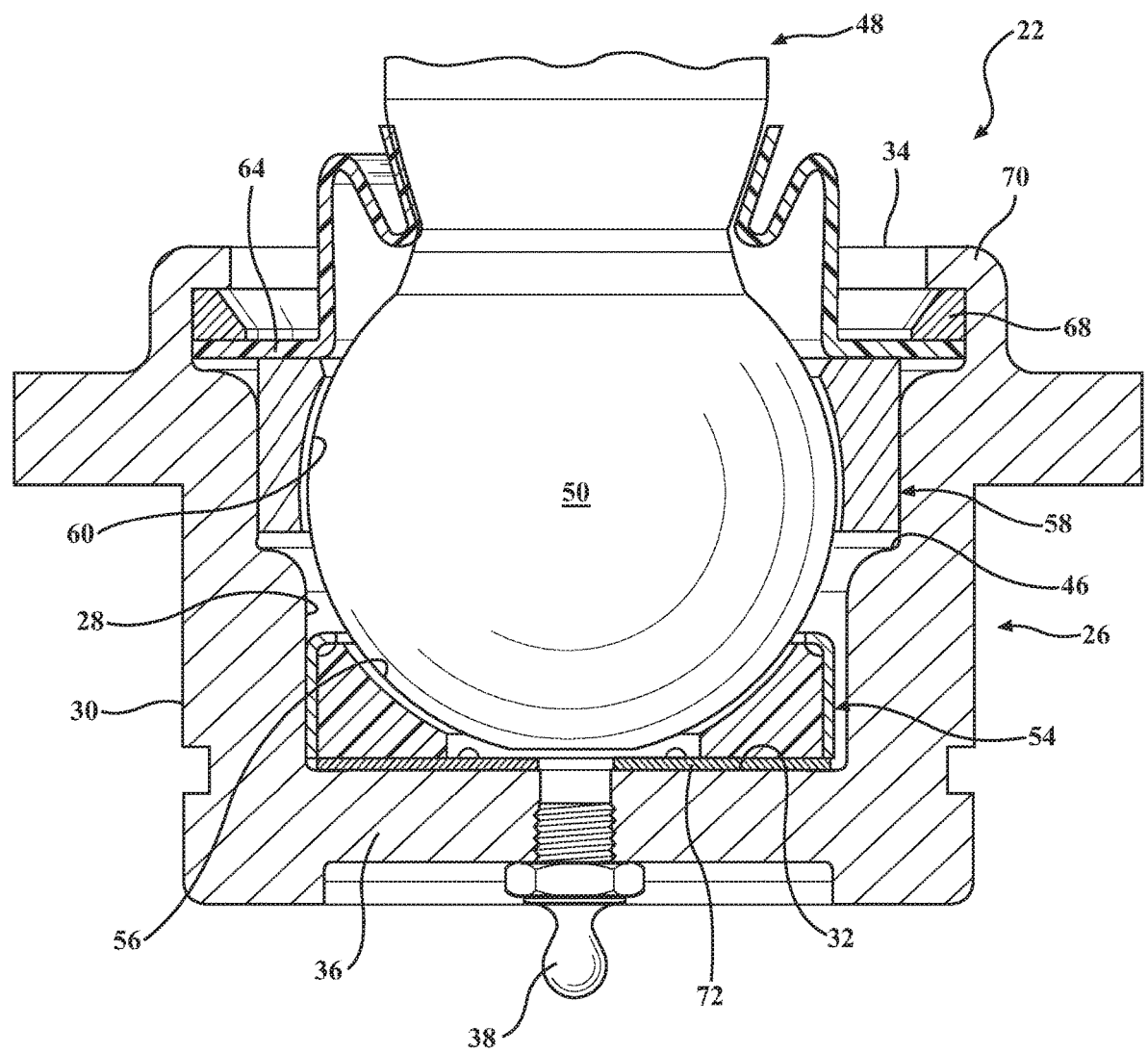
FIG. 5 is a cross-sectional view of the improved socket assembly with an exit bearing being asymmetrically formed.
Figure 6:
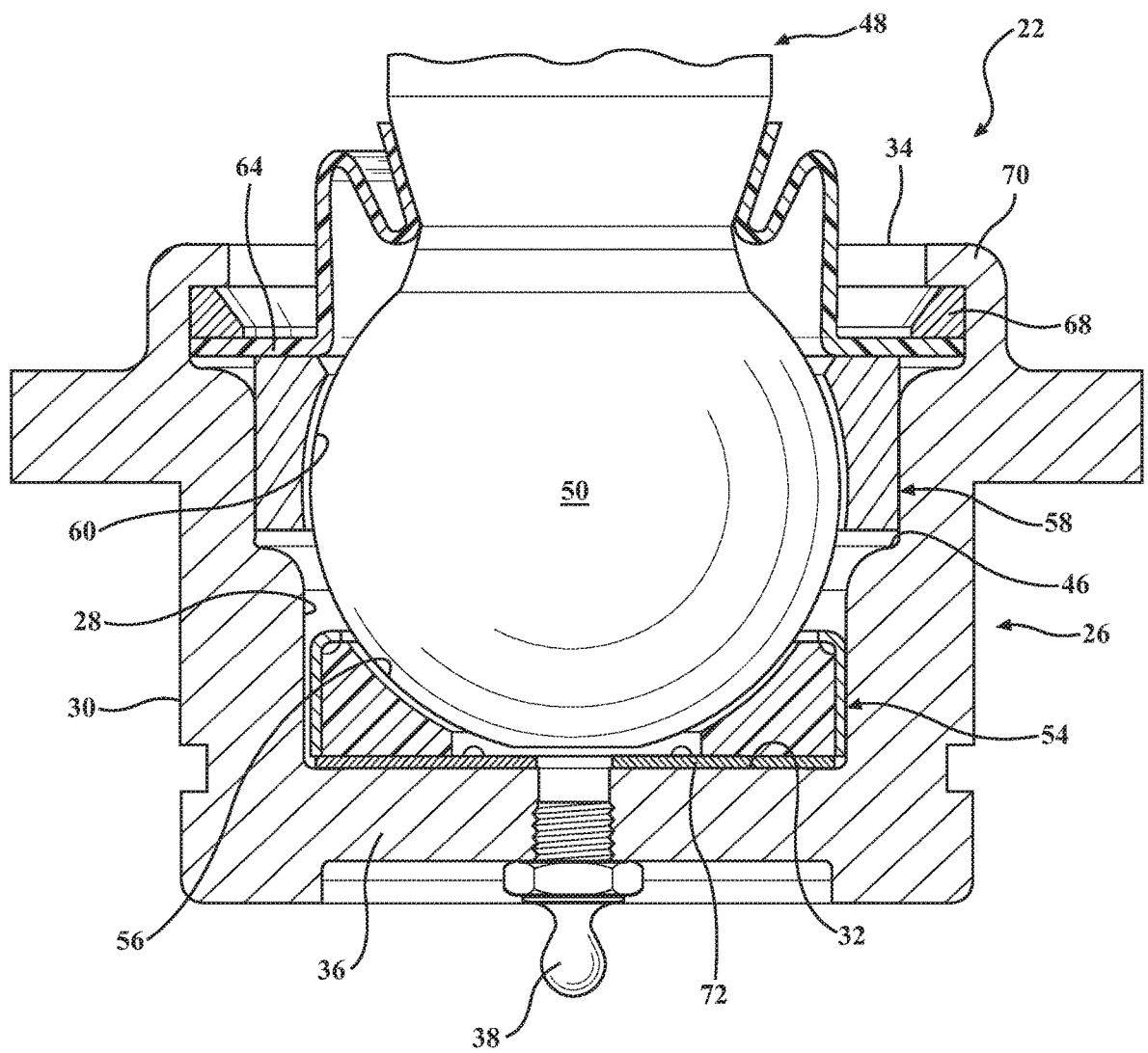
FIG. 6 is a cross-sectional view of the improved socket assembly with a backing bearing being asymmetrically formed.

For example, in the embodiment shown in FIG. 5, the exit bearing 58 is asymmetrical, and in FIG. 6, the backing bearing 54 itself is asymmetrical. In each of these cases, the backing bearing 54 has moved radially to account for the asymmetry and allow the ball portion 50 to evenly contact both of the first and second bearing surfaces 56, 60 of the backing and exit bearings 54, 58 respectively. In each of these examples, if the backing bearing 54 was unable to float within the inner bore, there would at least be uneven loading of the ball portion 50 on one or both of the bearings 54, 58 or the ball stud 48 could possibly become locked with the bearings 54, 58 and be unable to articulate or rotate relative to the housing 26.

Figure 7:
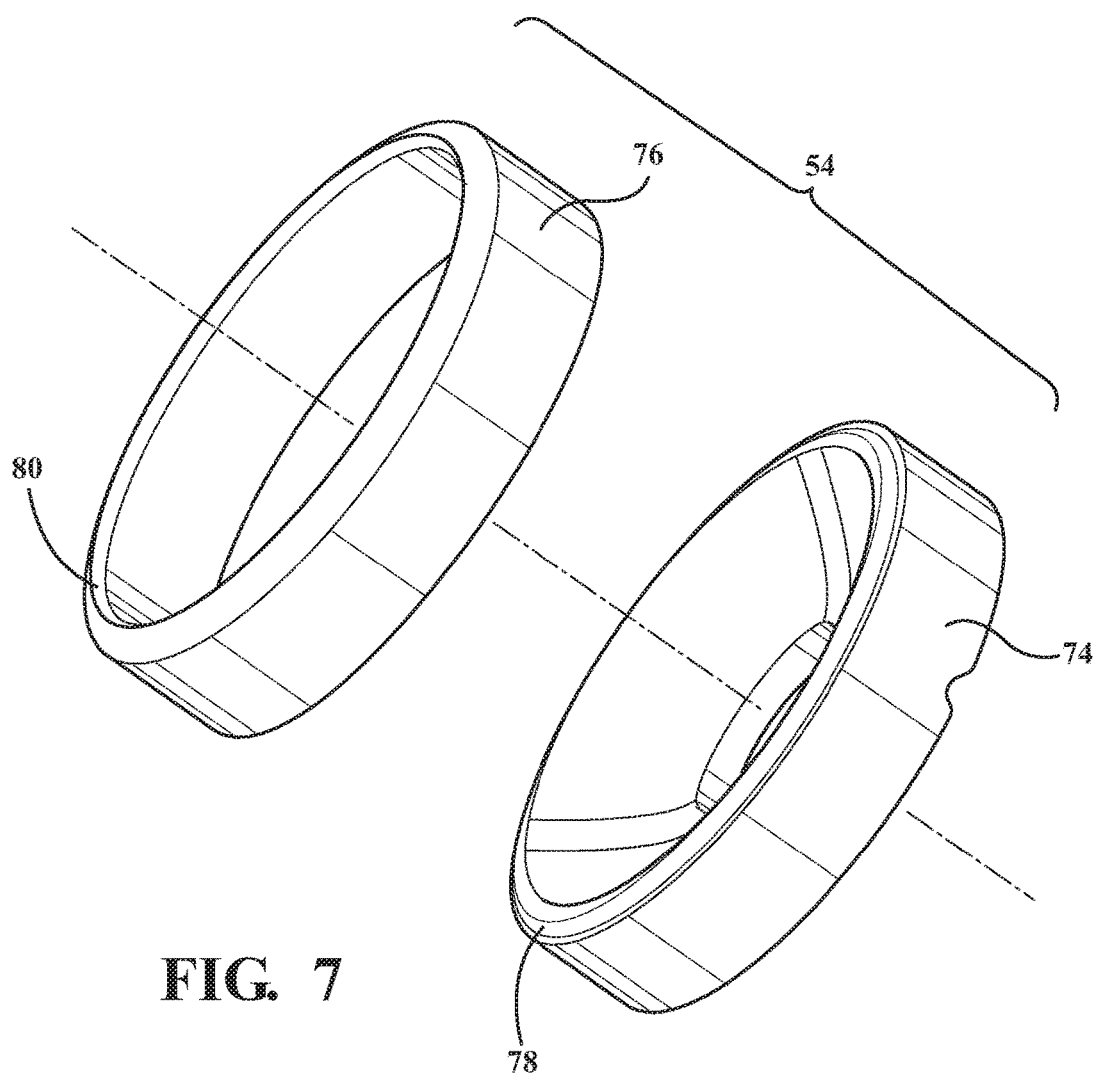
FIG. 7 is an exploded view of the backing bearing.
Figure 8:
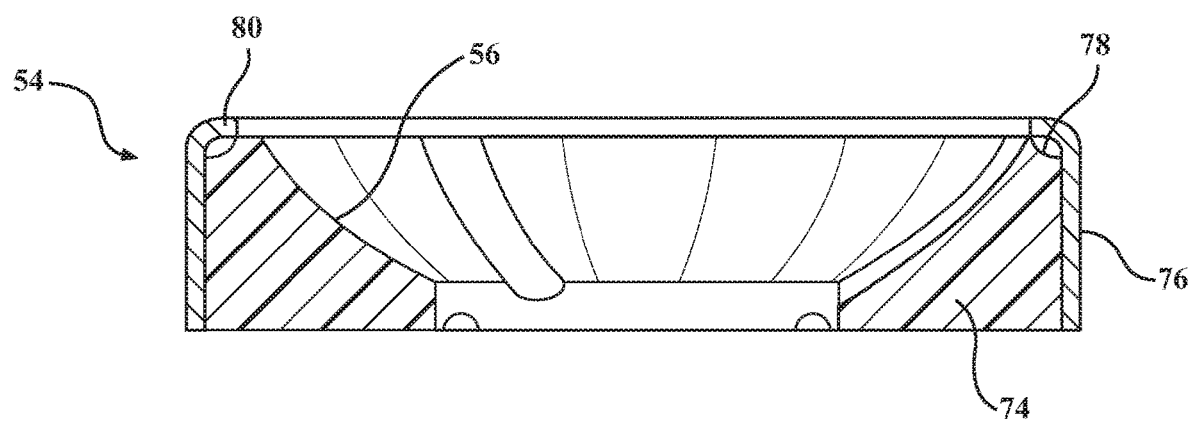
FIG. 8 is a cross-sectional view of the backing bearing.

As shown in FIGS. 7 and 8, the backing bearing 54 includes a polymeric (specifically, plastic) piece 74 and a metal sleeve 76. The plastic piece 74 includes the first bearing surface 56, and thus, only the plastic piece 74 contacts the ball portion 50 (shown in FIG. 4) of the ball stud 48. A top surface of the plastic piece 74 is provided with an annular notch 78 which opens both radially and axially. In this embodiment, the metal sleeve 76 has an inwardly extending flange 80 which extends partially into the notch 78, thereby reducing the amount that the metal sleeve 76 projects above the plastic piece 74. The plastic piece 74 is preferably press-fit into the metal sleeve 76 until the flange 80 contacts the plastic piece 74 in the notch 78. The metal sleeve 76 is preferably made of a powdered metal through an additive manufacturing process (such as three-dimensional printing or selective laser sintering) or of sheet steel that is stamped to its final form. The plastic piece 74 is preferably made through an injection molding operation.

The metal sleeve 76 reinforces the plastic piece 74 and restricts radial expansion of the plastic piece 74 when the ball stud 48 is loaded against the backing bearing 54. This improves the durability of the socket assembly 22 by reducing the risk of the plastic piece 74 cracking when under load. Thus, the metal sleeve 76 allows the backing bearing 54 to be mostly made of plastic, which provides cost and mass (weight) savings as compared to all metal backing bearing designs. Also, unlike metal bearing designs, the plastic piece 74, which is the only piece that touches the ball stud 48, is not susceptible to corrosion.

Another aspect of the present invention is a method of making a socket assembly 22, such as the exemplary embodiment shown in FIGS. 2-4. The method includes the step of preparing the housing 26. The method continues with the step of inserting the spring 72 into the inner bore such that the spring 72 rests against the lower wall 36. The method proceeds with the step of inserting (preferably, pressing) the plastic piece 74 of the backing bearing 54 into the metal sleeve 76. The method continues with the step of inserting the backing bearing 54 into the inner bore of the housing 26 such that the backing bearing 54 is movable relative to the housing 26 in a radial direction by sliding along the compressed spring 72. The method proceeds with the step of inserting the ball portion 50 of the ball stud 48 into the inner bore and establishing slidable contact between the ball portion 50 and the first bearing surface 56 of the backing bearing 54. The method continues with the step of inserting the exit bearing 58 into the inner bore to establish slidable contact between the second curved bearing surface 60 and the ball portion 50 of the ball stud 48. The method proceeds with inserting the flange 64 of the dust boot 62 into the inner bore. The method continues with the step of deforming, such as through swaging, the open second end 34 of the housing 26 to capture the flange 64, exit bearing 58, ball portion 50, backing bearing 54 and spring 72 in the inner bore of the housing 26. The method may then continue with injecting a lubricant into the inner bore and inserting the socket assembly 22 into an opening of the control arm body 24.

It should be appreciated that the use of the terms of direction, such as "upper", "lower" and "top", as herein is in reference to the orientation of the socket assembly in the Figures and is not considered to require a particular orientation.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A socket assembly, comprising:
   a housing having an inner bore which extends along a central axis from a closed first end to an open second end;
   a ball stud including a ball portion and a shank portion;
   said ball portion being received in said inner bore of said housing and said shank portion projecting out of said inner bore through said open second end;
   a backing bearing disposed in said inner bore of said housing and having a curved bearing surface that is in slidable contact with said ball portion of said ball stud;
   said backing bearing including a polymeric piece;
   said backing bearing further including a sleeve made of metal and surrounding said polymeric piece to resist radial expansion of said polymeric piece; and
   said backing bearing having an outer diameter that is less than a diameter of said inner bore of said housing so that said sleeve and said polymeric piece of said backing bearing can move in a radial direction within said inner bore of said housing.

2. The socket assembly as set forth in claim 1 wherein said polymeric piece includes a notch.

3. The socket assembly as set forth in claim 2 wherein said sleeve includes a flange which extends at least partially into said notch.

4. The socket assembly as set forth in claim 1 wherein said sleeve is made of a powdered metal or stamped steel.

5. The socket assembly as set forth in claim 1 wherein only said polymeric piece of said backing bearing contacts said ball portion of said ball stud and said metal sleeve does not contact said ball portion of said ball stud.

6. The socket assembly as set forth in claim 1 further including a spring disposed in said inner bore between said closed first end of said housing and said backing bearing.

7. The socket assembly as set forth in claim 1 wherein said curved bearing surface of said backing bearing is a first curved bearing surface and further including an exit bearing with a second curved bearing surface that is in slidable contact with said ball portion of said ball stud.

8. The socket assembly as set forth in claim 7 wherein said housing is deformed adjacent said open first end to capture said backing bearing and said ball portion of said ball stud and said exit bearing in said inner bore.

9. The socket assembly as set forth in claim 7 further including a spring which biases said second curved bearing surface of said exit bearing against said ball portion of said ball stud.

10. A method of making a socket assembly, comprising the steps of:

preparing a housing with an inner bore which extends along a central axis from a closed first end to an open second end;

making a polymeric piece of a backing bearing out of a polymeric material;

inserting the polymeric piece of the backing bearing into a metal sleeve such that the metal sleeve surrounds the polymeric piece;

inserting the backing bearing into the inner bore of the housing through the open second end and wherein the backing bearing has a diameter that is less than the inner bore of the housing so that the polymeric piece and the metal sleeve are movable within the inner bore in a radial direction relative to the housing; and inserting a ball portion of a ball stud into the inner bore of the housing through the open second end and establishing slidable contact between the ball portion of the ball stud and a curved bearing surface of the plastic piece of the backing bearing.

11. The method as set forth in claim 10 wherein the polymeric piece includes a notch.

12. The method as set forth in claim 11 wherein the metal sleeve includes a flange which extends at least partially into the notch.

13. The method as set forth in claim 10 further including the step of inserting a spring into the inner bore of the housing.

14. The method as set forth in claim 13 wherein the curved bearing surface of the backing bearing is a first curved bearing surface and further including the step of inserting an exit bearing into the inner bore of the housing and establishing slidable contact between a second curved bearing surface of the exit bearing and the ball portion of the ball stud.

15. The method as set forth in claim 14 further including the step of deforming the housing adjacent the open second end to capture the spring and the backing bearing and the ball portion of the ball stud and the exit bearing in the inner bore.

* * * * *